Patented Apr. 6, 1954

2,674,596

UNITED STATES PATENT OFFICE 2,674,596

BASIC DERIVATIVES OF IMINODIBENZYL

Franz Häfliger and Walter Schindler, Basel, Switzerland, assignors to J. R. Geigy A. G., Basel, Switzerland, a Swiss firm No Drawing. Application January 22, 1953,
Serial No. 332,750

Claims priority, application Switzerland
January 25, 1952

4 Claims. (Cl. 260—239)

This invention concerns new basic derivatives of iminodibenzyl of the general formula:

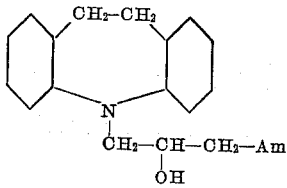

wherein Am represents a low molecular alkylamino- or dialkylamino radical, the pyrrolidino or piperidino radical.

It has been found that these compounds have interesting pharmacological properties, in particular they have a spasmolytic, anti-histaminic and hypnotic action.

The compounds according to this invention can be produced by reacting an amine of the general formula:

Am—H with N-(2.3-epoxy-propyl)-iminodibenzyl of the formula:

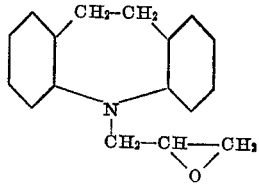

wherein Am has the meaning given above. The reaction can take place in the presence or absence of solvents, with advantage in the warm. The reactions are performed under normal pressure for example at the boiling temperature of the amine or of the solvent, as which ethanol and methanol can be named, according to the reactive qualities and boiling point of the amine or of the solvent used, or they can be performed at higher temperatures in autoclaves.

As starting materials of the formula Am—H can be named, for example: methylamine, ethylamine, n-propylamine, n-butylamine, dimethylamine, methyl-ethylamine, diethylamine, di-n-propylamine, di-n-butylamine, methyl-n-butylamine, pyrrolidine and piperidine.

N-(2.3 - epoxy-propyl) - iminodibenzyl can be produced for example by reacting an alkali metal compound, e. g. the sodium or lithium compound of iminodibenzyl with epichlorohydrin.

The new hydroxydiamine compounds form monoacid salts with inorganic and organic acids; some of the salts are easily soluble in water.

The following examples illustrate the production of the compounds according to the present invention. Parts are given as parts by weight and their relationship to parts by volume is as that of grammes to cubic centimetres. The temperatures are in degrees centigrade.

EXAMPLE 1

*Hydrochloride of N-(3-methylamino-2-hydroxy-propyl)-iminodibenzyl*

10 parts of iminodibenzyl and 5 parts of epichlorohydrin are dissolved in 60 parts by volume of abs. benzene and are heated to about 40–50°. 2 parts of sodium amide suspended in toluene are added while stirring vigorously. The temperature rises to 65° whereupon the whole is boiled for a further 6 hours under reflux. After cooling, water is added to decompose the product, the benzene solution is washed, dried and evaporated. On distilling off the residue, N-(2.3-epoxy-propyl)-iminodibenzyl is obtained.

B. P.$_{0.2}$ 165–166°

It can be recrystallised from benzine; M. P. 73–74°.

5 parts of N-(2.3-epoxy-propyl)-iminodibenzyl are heated in an autoclave to 120° with a 20% solution of methylamine in ethanol. After cooling, the excess methylamine and the ethanol are evaporated in the vacuum. The residue is taken up in ether and the hydrochloride is precipitated by the addition of abs. alcoholic hydrochloric acid. It can be recrystallised from abs. alcohol and melts at 190–191°.

EXAMPLE 2

*Hydrochloride of N-(3 - dimethylamino - 2 - hydroxypropyl)-iminodibenzyl*

10 parts of the epoxy compound produced according to Example 1 are heated in a steel autoclave to 110–115° with 60 parts by volume of a 20% solution of dimethylamine in methanol. After cooling, the volume is reduced in the vacuum, the residue is dissolved in 15% hydrochloric acid and any cloudiness is removed by ethering out. The clear acid solution is made alkaline and the base which precipitates is ethered out. The hydrochloride is precipitated by the addition of alcoholic hydrochloric acid to the ether solution. It is recrystallised from isopropanol and melts at 212-213°.

EXAMPLE 3

*Hydrochloride of N-(3-diethylamine-2-hydroxypropyl)-iminodibenzyl*

42 parts of the epoxy compound obtained according to Example 1 are boiled under reflux for 24 hours with 100 parts by volume of pure diethylamine. The excess diethylamine is then distilled off in the vacuum and alcoholic hydrochloric acid is added to the oily residue whereupon the hydrochloride of N-(3-diethylamino-2-hydroxypropyl)-iminodibenzyl precipitates. M. P. 188-189°.

By using the corresponding bases instead of diethylamine, the following compounds can be produced in an analogous manner:

Hydrochloride of N-(3-pyrrolidino-2-hydroxypropyl)-iminodibenzyl M. P. 248-250°, decomposition,
Hydrochloride of N-(3-piperidino-2-hydroxypropyl)-iminodibenzyl, M. P. 260°,
Hydrochloride of N-(dipropylamino-2-hydroxypropyl)-iminodibenzyl,
Hydrochloride of N-(ethylamine-2-hydroxypropyl)-iminodibenzyl,
Hydrochloride of N-(butylamino-2-hydroxypropyl)-iminodibenzyl.

What we claim is:

1. An N-(3-amino-2-hydroxypropyl)-iminodibenzyl corresponding to the formula:

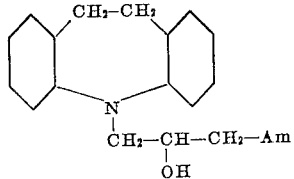

wherein Am represents a member selected from the group consisting of low molecular alkylamino radicals, low molecular dialkylamino radicals and cyclic alkylene-imino radicals with 5 to 6 ring members.

2. An N-(3-amino-2-hydroxypropyl)-iminodibenzyl corresponding to the formula:

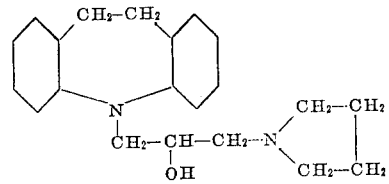

3. N-(3-dimethylamino-2-hydroxypropyl)-iminodibenzyl.

4. N-(3-diethylamino-2-hydroxypropyl)-iminodibenzyl.

No references cited.